United States Patent
Hsieh et al.

(10) Patent No.: US 9,730,491 B2
(45) Date of Patent: Aug. 15, 2017

(54) SAFETY TOE CAP MADE FROM NANO COMPOSITE MATERIAL AND PREPARATION METHOD OF NANO COMPOSITE SAFETY TOE CAP

(71) Applicants: HsuehHuan Hsieh, Huai'an (CN); MengNan Hsieh, Huai'an (CN); WanWen Wang, Huai'an (CN)

(72) Inventors: HsuehHuan Hsieh, Huai'an (CN); MengNan Hsieh, Huai'an (CN); WanWen Wang, Huai'an (CN)

(73) Assignee: CONTENDER COMPOSITE INC., Huai'an (CN)

( * ) Notice: Subject to any disclaimer, the term of this patent is extended or adjusted under 35 U.S.C. 154(b) by 432 days.

(21) Appl. No.: 14/536,100

(22) Filed: Nov. 7, 2014

(65) Prior Publication Data
US 2015/0342301 A1 Dec. 3, 2015

(30) Foreign Application Priority Data
May 28, 2014 (CN) .......................... 2014 1 0231446

(51) Int. Cl.
*A43B 23/16* (2006.01)
*B82Y 30/00* (2011.01)
(Continued)

(52) U.S. Cl.
CPC ............ *A43B 23/086* (2013.01); *B82Y 30/00* (2013.01); *B82Y 40/00* (2013.01)

(58) Field of Classification Search
CPC ..... A43B 23/08; A43B 23/081; A43B 23/086; A43B 23/087; A43B 23/16; A43B 23/17;
(Continued)

(56) References Cited

U.S. PATENT DOCUMENTS 5,350,826 A * 9/1994 Watanabe ................... C08J 5/24
525/423
2011/0093997 A1* 4/2011 Favreau ............... A43B 3/0026
2/2.5

FOREIGN PATENT DOCUMENTS

CN 2742806 11/2005

* cited by examiner

*Primary Examiner* — Frank Vineis
(74) *Attorney, Agent, or Firm* — Hamre, Schumann, Mueller & Larson, P.C.

(57) ABSTRACT

The invention discloses safety toe caps made from nano composite material and a preparation method of the nano composite safety toe cap. The toe caps are made from multi-layers of laminated glass fiber cloth coated with resin paste, wherein the percentage ratio of the resin paste to the glass fiber cloth is as follows: the resin paste accounts for 30-45%, the glass fiber cloth accounts for 55-70%, and the total sum is 100%; the resin paste comprises the following components in percentage by mass: 30-50% of thermosetting resin, 0.1-5% of modified carbon nanotubes, 10-30% of modified nitrile rubber, 5-25% of polyurethaneacrylate, 1-5% of prepolymerized silane oligomer, 0.5-2% of a high-temperature initiator such as tert-Butyl peroxybenzoate, 1-2% of a medium-temperature initiator such as tert-Butyl peroxy-2-ethylhexanoate, 5-20% of a shrinkage-reduction additive, 1-10% of thickener A, 1-3% of thickener B and 2-5% of inner demolding agent. The safety toe caps made from the nano composite material is are high in pressure resistance and impact resistance, light in weight and thin in wall thickness.

10 Claims, 3 Drawing Sheets

Current safety toe caps

Safety toe cap of this invention

(51) Int. Cl.
*B82Y 40/00* (2011.01)
*A43B 23/08* (2006.01)

(58) Field of Classification Search
CPC .............. B82Y 30/00; B82Y 40/00; C01B
31/022–31/0293; C01B 2202/00; C01B
2202/02; C01B 2202/04; C01B 2202/06;
C01B 2202/08; C01B 2202/10; C01B
2202/20; C01B 2202/26; C01B 2202/34;
C01B 2202/36; B32B 5/024; B32B 5/145;
B32B 17/02; B32B 17/04; B32B 25/00;
B32B 25/02; B32B 25/10; B32B 25/14;
B32B 27/00; B32B 27/04; B32B 27/06;
B32B 27/12; B32B 27/18; B32B 27/20;
B32B 27/26; B32B 27/28; B32B 27/38;
B32B 33/00; B32B 2255/02; B32B
2260/02; B32B 2260/021; B32B 2260/04;
B32B 2260/046; B32B 2260/048; B32B
2262/101; B32B 2270/00; B32B 2305/07;
B32B 2305/073; B32B 2305/08; B32B
2305/10; B32B 2305/18; B32B 2305/186;
B32B 2305/30; B32B 2307/536; B32B
2307/558; B32B 2307/581; B32B
2307/5825; B32B 2363/00; D03D 1/0035;
D03D 1/0041; D03D 15/0011; D06M
15/19; D06M 15/55; D06M 15/693;
D06M 2101/40; D06N 3/0002; D06N
3/0009; D06N 3/0022; D06N 3/0063;
D06N 2201/087; D10B 2101/06; D10B
2101/122; D10B 2401/062; D10B
2501/043
USPC .............. 12/146 D, 146 R; 442/103, 108;
523/167; 977/742–752, 842–848;
428/299.4, 903; 36/68, 77 R, 77 M
See application file for complete search history.

Current safety toe caps　　　Safety toe cap of this invention

SAFETY TOE CAP MADE FROM NANO COMPOSITE MATERIAL AND PREPARATION METHOD OF NANO COMPOSITE SAFETY TOE CAP

BACKGROUND OF THE INVENTION

Field of the Invention

The invention relates to the technical field of safety toe cap production, and in particular relates to safety toe caps made from a nano composite material and a preparation method of the toe caps.

Description of the Related Art

At present, the safety toe caps made from a thermosetting composite material are used more and more widely in industry, for example, in the Chinese patent No. CN2742806Y of the applicant, the safety toe caps are made by arranging and pressing multi-layers of continuous long fiber woven cloth which was pre-wetting by thermosetting resin in a specific direction, and results show that the mechanical properties, such as the pressure resistance and the impact resistance, of the safety toe caps are much better than that of a safety toe caps which are formed by thermal plastic injection method or made from a short-fiber reinforcing thermosetting composite material such as BMC. However, as different countries of the world continuously upgrade the safety testing standards, to achieve the safety requirements, safety toe caps made from the thermosetting/long-glass fiber reinforcing composite material need to be made into a certain thickness.

After 2008, because of the outburst of financial crisis and European debt crisis, economic recession happened all around the world and particularly in Europe and America. As a result, purchasing power was reduced, and people generally buy fewer pairs of shoes. Conventional safety shoes (boots) are heavy in weight and limited in function. The market urgently demands multifunctional safety shoes. When the safety toe caps are put into ordinary leisure shoes, sports shoes and outdoor shoes, the shoes are suitable for both working and living. As a result, people can buy fewer pairs of shoes, saving money, and the shoes can be worn more conveniently. To achieve the requirements for appearance and design, the multifunctional safety shoes urgently need safety toe caps which are very thin in thickness and light in weight. However, conventional safety toe caps made from the composite material are still too thick and cannot meet the design requirement. There is a need improve the pressure resistance and the impact resistance of the composite material to a great extent so as to manufacture thin and light safety toe caps made from the composite material.

SUMMARY OF THE INVENTION

This invention is an improvement scheme of the patent of the publication patent number CN2742806Y, and aims at providing a nano composite material safety toe cap which is high in pressure resistance, high in impact resistance, light in weight and thin in wall thickness. This solves the technical problems of safety toe cap thickness, weight and strength while meeting the requirements of the novel multifunctional safety toe caps on appearance and design.

The invention further provides a preparation method for the safety toe caps made from the nano composite material.

The invention adopts the following technical scheme for solving the technical problems:

The invention discloses safety toe caps made from nano composite material and a preparation method for the toe caps. The toe caps are made from a plurality of layers of glass fiber cloth coated with resin paste. The percentage ratio of the resin paste to the glass fiber cloth is as follows: the resin paste accounts for 30-45%, the glass fiber cloth accounts for 55-70%, and the total sum is 100%. The resin paste comprises the following components in percentage by mass: 30-50% of thermosetting resin, 0.1-5% of modified carbon nanotubes, 10-30% of modified nitrile rubber, 5-25% of polyurethaneacrylate, 1-5% of prepolymerized silane oligomer, 0.5-2% of a high temperature initiator such as tert-Butyl peroxybenzoate, and 1-2% of a medium temperature initiator such as tert-Butyl peroxy-2-ethylhexanoate, 5-20% of a shrinkage reduction additive, 1-10% of a thickener A, 1-3% of a thickener B and 2-5% of inner demolding agent.

Preferably, the glass fiber cloth is a piece of silane modified alkali-free glass fiber cloth, which may include warp yarns and weft yarns which are interleaved. A sizing procedure is performed. The silane coupling agent is coated on the surface of the glass fiber cloth. The coupling agent could react with a silanol group on the surface of the glass fiber cloth, linked by covalent bond, the surface of the glass fiber cloth had attached with unsaturated functional group which can react with the resin after the sizing process.

Preferably, the method for preparing the silane modified alkali-free glass fiber cloth comprises the following steps: immersing the alkali-free glass fiber cloth into ethanol solution of silane coupling agent with the mass concentration of 3-8%, keeping for 10-20 seconds at 20-25° C., subsequently taking out the alkali-free glass fiber cloth, and drying for 10-12 hours in nitrogen at 90-110° C.

Preferably, the thermosetting resin is a bisphenol-A epoxy based vinyl ester resin; the high temperature initiator A is tert-Butyl peroxybenzoate, the medium temperature initiator B is tert-Butyl peroxy-2-ethylhexanoate, the low-profile additive is polycaprolactone, the thickener A is magnesium oxide, the thickener B is magnesium hydroxide, and the inner demolding agent is zinc stearate.

Preferably, the preparation method of the modified carbon nanotubes comprises the following steps:

(1) firstly, making the carbon nanotubes into a plate shape (to avoid the contamination inside the chamber) with the thickness of 0.5-1 mm and the diameter of 0.5-5 cm, and immersed into plasma to react for 300-1,200 seconds to obtain an oxidized carbon nanotubes;

(2) adding the oxidized carbon nanotubes into a mixture of 95 wt % ethanol and silane coupling agent, which are mixed according to a weight ratio of 50:(1-10), and than adding hydrochloric acid to regulate the pH value to be 2.5-5.5, heating for 3-6 hours at 50-75° C., washing and filtering for 2-4 times by using ethanolanhydrous ethanol, and subsequently placed into a oven at 60-80° C. for 6-8 hours in nitrogen.

Preferably, the carbon nanotubes are single-walled carbon nanotubes or multi-walled carbon nanotubes; the diameter of the carbon nanotubes is 10-90 nanometers; the length is 5-50 micrometers.

Preferably, the plasma comprises argon and steam. The argon in the plasma has a purity of 99.995%. The steam accounts for 0.5-5% of the volume percent of the raw material. The frequency of the radio-frequency for generating the plasma is 13.56 MHz. The R-F power of plasma generator is 100-250 W.

Preferably, the preparation method of the modified nitrile rubber comprises the following steps:

(1) in parts by weight, uniformly mixing 5-10 parts of methyl acrylic monomer, 50-60 parts of butadiene and 10-40 parts of acrylonitrile into a mixture liquid, further adding azodiisobutyronitrile (AIBN) which accounts for 0.5-2% of the weight of the mixture liquid and tert-dodecylthiol (with the CAS number of 25103-58-6, as a molecular weight regulator) which accounts for 0.1-1% of the weight of the mixture liquid, introducing nitrogen, subsequently continuously stirring, heating to be 50-70° C., and reacting for 2-5 hours at constant temperature so as to obtain carboxy-terminated butadiene-acrylonitrile (CTBN);

(2) in parts by weight, mixing 10-25 parts of carboxy-terminated butadiene-acrylonitrile, 100 parts of bisphenol-A epoxy based vinyl ester resin, 15-25 parts of methacrylic acid and 1-2 parts of triphenylphosphine (TPP with the CAS number of 603-35-0), continuously stirring under nitrogen atomsphere, raising the temperature to be 100-150° C., keeping the temperature and reacting for 2-4 hours, and after the reaction, naturally cooling down to the room temperature.

Preferably, the preparation method of the prepolymerized silane oligomer comprises the following steps: in parts by weight, adding 1-3 parts of 95 wt % ethanol into 2-5 parts of a silane coupling agent such as γ-methacryloyloxypropyltrimethoxysilane (KH-570, CAS No.:2530-85-0), continuously stirring under the condition that nitrogen is supplied, raising the temperature to be 60-80° C., keeping the temperature and reacting for 2-5 hours, and finally depressurizing and distilling to remove ethanol solution.

A preparation method of the safety toe cap made from the nano composite material comprises the following steps: uniformly mixing up components of the resin paste according to a specific ratio, subsequently uniformly coating the mixture on a single layer of glass fiber cloth, subsequently respectively covering a layer of PE film on the upper and lower surfaces of the glass fiber cloth coated with the resin paste covered with a layer of PE film for keeping the resin weight ratio, rolling through a roller to obtain a sheet material, aging the sheet material for 20-28 hours at 35-45° C., cutting the aged sheet material, tearing the PE films off of the aged sheet material, stacking the cut aged sheet material into pre-formed toe caps by using a hand lay-up method (stacking 5-12 layers), further putting the pre-formed toe caps into a fixing mold on a hot-pressing machine, hot-pressing for 150-200 seconds (according to the thickness of the toe cap) at a pressure of 30-45 MPa at 135-155° C. so as to form the toe cap, demolding the toe cap, and subsequently grinding and trimming to obtain the final toe cap product.

The safety toe caps in this patent are novel products that use the concept of nano material (modified carbon nano-tubes) reinforcing into safety toe caps for the first time in the world. The nano reinforcing material is specially modified to satisfy the properties of the resin used to form the toe caps. The strength and the toughness of the resin can be obviously improved by the nano reinforcing material, and thus using the nano composite material be used in a toe cap product.

The toughness of the resin may be enhanced by using a plurality of special toughening agents in addition to the modified carbon nanotubes. Compared with the conventional manufacturing technique of the toe caps, the toughness and the safe inner height of the toe cap after impact are improved obviously, and the toe caps can meet the safety testing standards of most countries even with only a small thickness. As the thickness of the toe cap product is reduced, the weight of the toe caps becomes lighter at the same time, achieving the multiple purposes of being lighter and thinner.

The thermosetting resin used in the safety toe caps is a type of unsaturated polyester resin which with both the excellent property of epoxy resin. The bisphenol-A epoxy based vinyl ester resin is a type of the polyester resin, and the structural formula of the molecule is as follows:

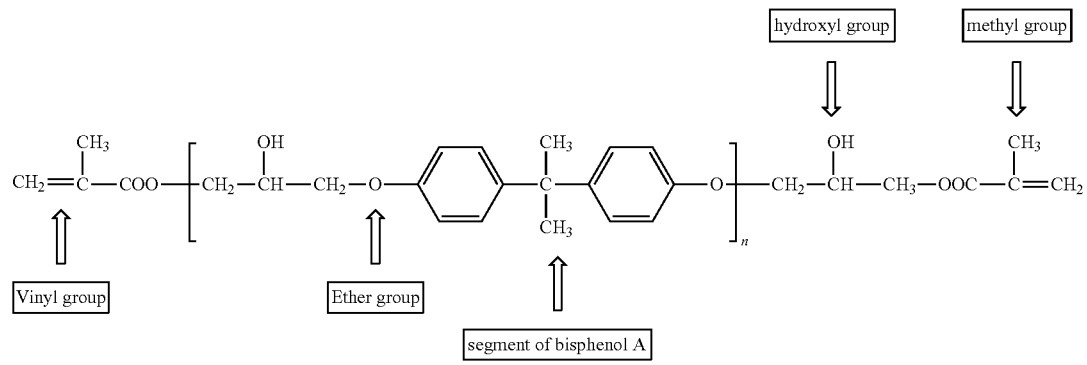

wherein the segment of bisphenol-A on the molecular chain contains a structure of benzene ring on the skeleton which can provide chemical stability, mechanical rigidity and thermal stability, so that the product has high thermal resistance. The ether bond (—O—) on the skeleton has great chemical stability. The methyl group (—CH$_3$) has a shielding effect, protecting the ester group. This shielding effect enables the ester group to be more difficult to hydrolyze (ester group (—COO—) on its own is easily hydrolyzed by alkali and water), and improves the hydrolysis resistance. Hydroxyl group (—OH) improves the wettability and the binding properties of the resin. The wettability of the resin and the glass fiber woven cloth is improved, and the glass fiber cloth can be completely wetted and sufficiently adhered to the resin so as to improve the inter-laminar shear strength of the toe cap product. The carbon-carbon double-bond structure (C═C) of the unsaturated olefin is positioned at the end part of the resin molecule chain. The double bond, having high reaction activity, makes it easy to start the cross-linking reaction and shortens the curing time of the resin, increases the curing degree of the resin, and reduces the residual amount of the uncured monomer in the resin system at the same time. This also further improves the corrosion resistance of the resin. As the cross-linking only happens at two ends of the molecule, the main molecular chain can be elongated under stress, so as to absorb external force or impact energy, improving the impact resistance of the resin.

As the bisphenol-A epoxy based vinyl ester resin is prepared by polymerizing the epoxy resin and a monounsaturated acid such as methacrylic acid. The resin has the excellent properties both of the epoxy resin and the unsaturated polyester resin. In addition to excellent properties of mechanical strength, electrical insulation, water resistance, chemical resistance, high glass-transition temperature and thermal stability of the epoxy resin, the resin has excellent corrosion resistance. The resin also provides improved manufacturability. The unsaturated polyester resin, for example, has a viscosity much lower than that of classic epoxy resin. Furthermore, the curing time can be appropriately adjusted because of the unsaturated group at the end group of the resin structure.

These advantages make the bisphenol-A epoxy based vinyl ester resin is a good choice to be used as the resin substrate of the nano composite material.

Glass fiber cloth used in the present invention is an alkali-free glass fiber cloth modified by silane, which can generate a covalent bond between the silanol groups on silane coupling agent and the surface of glass fiber, making the glass fiber surface carry unsaturated functional groups which can react with resin to form covalent bonds between each other, increase the binding force of the interface of the glass fiber and the resin, and realizing the mutual benefits of both the resin and fiber.

The carbon nanotubes adopted in this invention are the single-walled carbon nanotubes or multi-walled carbon nanotubes that have a diameter of tens of nanometers (10 to 90 nm). The length of the carbon nanotubes can be up to tens of microns (10 to 50 um). With an ultrahigh aspect ratio of 1000:1 or more, the carbon nanotubes are extremely suitable for use as a reinforcing material. As the nanometer material has a high specific surface area (about 250 m$^2$/g, approximately 15 times that of general powdered graphite), the adopted carbon nanotubes can provide a more effective area reacting with resin to enhance interface strength, as the carbon atom on carbon nanotubes has special arrangement structure. The carbon nanotubes are characterized by light weight (the density is only ⅓ of that of steel), high strength (5 times of that of steel), high toughness, flexibility, and high elastic modulus which enables the carbon nanotubes to eliminate external force through a form of elastic deformation after being stressed. The carbon nanotubes have good recovery characteristics also exist after deformation. Furthermore, the rich π electron clouds of the carbon nanotubes stabilize the chemical properties, making the carbon nanotubes an ideal nano reinforcing material.

The modified carbon nanotubes are modified to make the surface of carbon nanotubes to functionalized, removing the aggregation phenomenon of carbon nanotubes in the resin and increasing the dispersity of the carbon nanotubes in resin. This functionalization produces the capacity to form the covalent bond between the carbon nanotubes and the resin base, thus developing strong binding strength at the organic/inorganic interface. When the composite is impacted by external force, the impact energy can be transferred to the carbon nanotubes which have a stronger mechanical strength than the resin base material, and then dissipate the impact energy through the elastic deformation or distortion of the carbon nanotubes, thus achieving the great toughening and reinforcing effect. Therefore, safety toe caps made from the nano composite material with higher strength can be produced which are thinner and lighter.

The functionalization of the carbon nanotubes is achieved by two steps. The first step is to perform plasma processing (oxidation treatment) on the surface of carbon nanotubes, generating hydroxyl groups (—OH) on the surface of the carbon nanotubes. The second step is to graft the functional groups which have the capacity to react with unsaturated groups on thermosetting resin to generate covalent bonds thereon, using the functional groups of a silane coupling agent and the hydroxyl groups on the surface of carbon nanotubes.

In the first step, the carbon nanotubes are pressed into a cake shape with the thickness of 0.5-1 mm and the diameter of 0.5-5 cm, and placed into a location away about 1 to 5 mm away from a plasma emission source in a reaction chamber to ensure that the carbon nanotubes can be fully soaked by the plasma for the oxidation reaction. The plasma source is prepared by mixing argon with a purity of 99.995% and water vapor in a gas mixer in which the volume percent of the water vapor is 0.5 to 5%. The mixed gas enters the chamber to generate —OH radicals. The radio frequency for producing the plasma is 13.56 MHz, and the power is between 100 and 250 W. The plasma reaction time for the pressed carbon nanotubes is 300 to 1200 seconds.

Comparing the plasma oxidation method with conventional oxidation methods of functionalizing carbon nanotubes, the conventional well-known oxidation method of carbon nanotubes uses strong acid and high temperature treatment (>50° C.) to oxidize the surface or ends of carbon nanotube, enabling —COOH and —OH groups to be grafted on to the surface of the carbon nanotube. The acid oxidation method can cause problems, cutting off the length or eroding the carbon nanotubes, resulting in poorer mechanical and electrical properties. The conventional method also produces acid waste liquid and acid diluents which cause disposal problems or environmental harm. The plasma oxidation process does not require strong acids or any chemical solvent, only to feed inert gases and water vapor and generate plasma to make oxidization functionalized carbon nanotubes. Plasma oxidation is a faster, saves energy, and is a more ecological method.

The second step for modifying the carbon nanotubes is as follows: adding the oxidized carbon nanotubes into a mixture of 95% ethanol and a silane coupling agent, adjusting pH to be between 2.5 and 5.5 by adding hydrochloric acid, under the condition of nitrogen, heating for 3 to 6 hours at between 50 and 75° C., enabling the Si—OCH group on the silane coupling agent to be hydrolyzed into Si—OH in an aqueous environment, wherein the Si—OCH group can undergo a condensation reaction with the —OH on the surfaces of carbon nanotubes to connect the silane coupling agent to with the surfaces of carbon nanotubes through covalent bonding, after the reaction, washing the products with anhydrous ethanol 2 to 4 times until the silane coupling agent on the non-grafted carbon nanotubes is washed out, and after cleaning, drying in an oven for 6 to 8 hours under a nitrogen atmosphere at 60 to 80° C.

The silane coupling agent molecules produce Si—OH after hydrolysis, and after oxidation treatment, the carbon nanotubes present —OH on the surfaces. The Si—OH and —OH can start a condensation reaction, covalently bonding the Si—OH and the —OH group on the carbon nanotube surface. This results in a new functional group being grafted to the carbon nanotubes, and this functional group can further react with resin, forming covalent bonds between the carbon nanotubes and the resin. When the resin and carbon nanotube material is impacted by external force, the force can be transferred to the carbon nanotubes, which excellent mechanical properties compared to the resin. The carbon nanotubes eliminate the external force via vibration, swing and similar spring-type recoverable deformations. This gives the combined resin and carbon nanotubes stress dispersion mechanisms which increase the impact resistance of the materials.

The resin may include toughening agents, such as modified nitrile rubber, polyurethane acrylate, and pre-polymerized silane oligomers. The toughening theory of each one is specified as follows:

1. Toughening mechanisms of modified nitrile rubber: an existing method is to toughen polyester resin using nitrile rubber (NBR). The modified nitrile rubber is introduced into the polyester resin using an alloying method. After the resin is cured, the rubber is distributed into the resin in small particles. The rubber particles in the resin can concentrate stress when the material is impacted by external force. If the stress is greater than the yield stress of the matrix, crazing can be efficiently induced, and the production of the crazing can absorb mass of impact energy and hinder the crazing from developing into cracks. Impact energy can also be consumed by the production of shear bands, achieving significant toughening effect. However, rubber cannot react with resin if there are no special chemical modifications performed to the surface of the rubber, causing unsatisfactory toughening effects, and causing other problems such as decreasing the glass transition temperature ($T_g$) of the cured resin after rubber is added. Therefore, in order to be consistent with the curing conditions of the adopted heat convertible resin, according to the invention, a methallyl group may be used for modifying the nitrile rubber, after grafting an unsaturated end group to the nitrile rubber. The nitrile rubber could be an elastomer with unsaturated end group, capable of being bonded together with the resin by covalent bond, producing a high interface binding strength, and achieving the toughening effect. The nitrite rubber after modification has two improved characteristics: the first one is to make the nitrile rubber have a reactive group capable of reacting with resin, to develop great covalent bond connection with resin after curing reaction, and able to efficiently enhance the impact properties of the material; the second one is that the elastomer can be distributed evenly in the main resin after being mixed, to develop smaller rubber micro areas, improving the compatibility between the rubber and the resin. This allows stress to be evenly released when the material is impacted. The finer and more uniform the dispersity of the modified nitrile rubber is in the resin, the more effectively it can suppress the problem of phase separation, and ensure that this obvious negative impact does not come up after toughening. According to the invention, the synthesis method of the modified nitrile rubber is as follows:

The modification of the nitrile rubber is achieved by performing pre-condensation and other methods on carboxyl-terminated butadiene-acrylonitrile (CTBN) and epoxy resin, making the ends of the rubber molecules carry unsaturated olefin groups capable of reacting with main resin, developing strong binding between modified rubber and main resin, and evenly dispersing the modified nitrile rubber into the resin, which avoids the occurrence of phase separation and overall performance degradation. The CTBN used for reacting with epoxy resin may be a powdery suspension which is obtained by the ternary copolymerization reaction between methacrylic acid monomer, butadiene, acrylonitrile and additives such as a peroxide initiator, azobisisobutyronitrile (AIBN), and a molecular weight regulator such as tert-dodecylthiol. This may be finished by filtering the CTBN. Acrylonitrile is added to nitrile rubber, thus improving its strength and wear resistance, as well as its oil resistance, adhesive properties, and ageing resistance. CTBN, epoxy resin, methacrylic acid and catalyst triphenylphosphine may then be mixed, with nitrogen introduced and the materials continuously stirred. Multiple reactions may be carried out at the same time, including the binding between CTBN and the epoxy resin, binding between the methacrylic acid and the epoxy resin by a condensation reaction, and/or binding between the methacrylic acid and epoxy resin which has already been grafted with CTBN. The acid value after reaction should be less than 30 mg KOH/g. After the reaction, the materials are cooled to room temperature, and the nitrile rubber modification is complete.

By utilizing the CTBN, the dispersion of modified rubber in resin phase (the polarity of modified rubber is adjusted by methacrylic acid to be similar to the structure of main resin) is improved, effectively improving the toughness of the material, preventing decreases of the strength of the material due to the addition of rubber. The addition of nitrile rubber can also bring reduce resin shrinkage and improve material toughness.

2. Polyurethaneacrylate (PUA) is oligomer of acrylate with unsaturated olefin groups, and has good compatibility with resin. PUA can be evenly dispersed in the resin for improving toughness. PUA has a urethane bond, and is characterized in that it is easy to form hydrogen bonds between the polymer molecules, which have high binding affinities. These hydrogen bonds can absorb the external energy by breaking the hydrogen bond, which can be formed again after the external force had been removed. Since the cracking and re-generation of the hydrogen bond are reversible, this makes resin have flexibility, high wear resistance, strong adhesion, excellent low temperature performance and the high tear strength (higher than rubber) of polyurethane after it has been cured.

3. Prepolymerized silane oligomer: the silane coupling agent γ-methacryloyloxypropyltrimethoxysilane (KH-570, CAS No.:2530-85-0), after being pre-hydrolyzed and condensed may be used in the present invention. γ-methacryloyloxypropyltrimethoxysilane (KH-570, CAS No.:2530-85-0), is a silane carrying three methoxyl groups and a methacryl functional group. The pretreatment of the silane starts with hydrolyzing the methoxy groups on the silane into silanol groups. The silane molecules are then condensed with the silanol groups on other silane molecules. After the hydrolysis and condensation step, the pre-polymerized silane coupling agent has condensed Si—O—Si segments which have high flexibility, and methacryl functional groups which can react with the resin. After being mixed into resin and after the curing of the resin, the pre-condensed oligomer of silane can react with the resin, and the oligomer and the resin can connect with each other by covalent bonding. When the resin is impacted by external force, mass interface bindings between the resin and the silane oligomer can transfer the stress from resin to the Si—O—Si segments of silane oligomer, which are flexible and tough, thus effectively toughening the resin. The modification time of the silane coupling agent needs to be controlled to adjust the compatibility of the silane oligomer after hydrolysis and condensation with the resin. This compatibility improves the dispersion of the pre-polymerized silane oligomer into the resin, so as to realize the toughening effect.

In order to promote the curing rate of the resin system, the initiator used is a mix of a high temperature initiator A, such as tert-Butyl peroxybenzoate, (CAS number:614-45-9) and a medium temperature initiator B, such as tert-Butyl peroxy-2-ethylhexanoate, (CAS number:3006-82-4). The curing reaction of the resin is exothermic. When the resin compounds are added into a die, heat is transferred from the die to the resin compound. However, a temperature difference exists between the resin compound and the die. When the temperature of the resin compound rises to a temperature where the medium temperature initiator may be decomposed by heat, the medium temperature initiator (initiator B) produces free radicals that start the curing reaction of resin. The curing reaction increases the overall temperature of the resin compound to the temperature needed for the high temperature initiator (initiator A) to be decomposed and thus enhance the curing rate of resin system and improve the conversion rate of the curing reaction to accelerate the curing.

A shrinkage reduction additive, such as polycaprolactone, may be used. The thermosetting resin may have significant shrinkage (about 8-10%). Polycaprolactone has a volume is similar to that of the resin compound at high temperature. While products are cooled, and when the temperature of resin drops down, the polycaprolactone can keep the shape of resin from being shrunk because of cold. One can effectively reduce or prevent shrinkage of the resin compound by adjusting the formula of the resin compound. Polycaprolactone can be uniformly dispersed in the resin, thus achieving the purpose of reducing shrinkage within uniform dispersity.

One or more thickening agents may be used in this invention to pre-polymerize the resin sheets to a certain viscosity at temperatures between 35 to 45° C., which is beneficial for the operation of hand lay-up method. Magnesium oxide and magnesium hydroxide, which has a higher activity than magnesium oxide, may be used. Use of magnesium hydroxide may shorten the curing time compared to the traditional formula which only uses magnesium oxide. The viscosity of the resin compound which is required by hand lay-up method can be obtained only after about 20 to 28 h when using magnesium oxide.

An internal demolding agent which may be used in this present invention is zinc stearate. In addition to demolding, zinc stearate also may be used to make the surface of a toe cap product bright and smooth, which is an important influence on product appearance and the adhesion process in subsequent shoemaking processes.

Through the above technical scheme, the modified carbon nanotubes and a variety of toughening agents can be evenly dispersed into resin base materials, and covalent bonding with resin can be formed during the process of a curing reaction, thus noticeably improving the compressive strength and the impact strength of the composite, and furthermore preparing the ultra-light and ultra-thin novel safety toe caps made from the nano composite material.

Beneficial effects of the present invention are as follows:
The safety toe caps made from nano composite material have good compressive strength and impact strength, light weight and thin wall thickness.

DETAILED DESCRIPTION OF THE INVENTION

Figure 1:
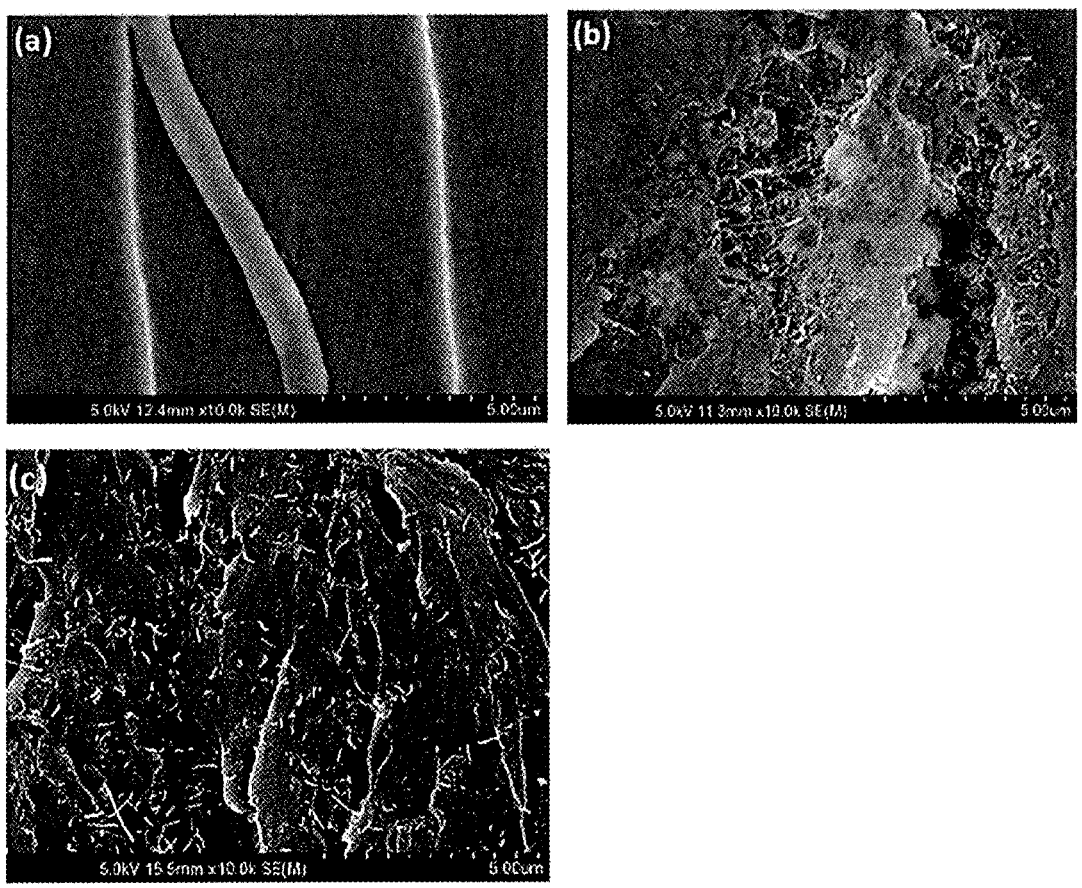
FIG. 1 is the profile SEM figure for single resin paste material samples,
In FIG. 1: (a) is the SEM figure of resin paste material in formula 2 for compared case; (b) is the SEM figure of resin paste material in formula 3 for compared case; (c) is the SEM figure of resin paste material in formula 4 for compared case.

Specific specifications for the technical solution of the invention are as follows according to specific embodiments and combined with drawings.

In this invention, in addition to specific indication, the adopted materials, equipment and the like can be purchased from market or commonly used in this field. Methods in the following embodiments are the conventional methods in this field in addition to specific indication.

Embodiment 1

1. Raw material formula:
The safety toe caps made from the nano composite material are composed of a plurality layers of glass fiber cloth coated with resin paste via laminating, mass percent of the resin paste and silane-modified alkali-free glass fiber cloth is as follows: 30% of resin paste, and 70% of alkali-free glass fiber cloth.

Counted by mass percent, the formula of resin paste is as follows: 50% of bisphenol-A epoxy vinyl resin (commercially available), 0.1% of modified carbon nanotubes, 10% of modified nitrite rubber, 5% of urethane acrylate (commercially available), 5% of prepolymerized silane oligomers, 1% of high temperature initiator A tert-Butyl peroxybenzoate (commercially available), 2% of medium temperature initiator B tert-Butyl peroxy-2-ethylhexanoate, commercially available, 20% of polycaprolactone (commercially available), 1% of magnesium oxide, 2% of magnesium hydroxide, and 3.9% of zinc stearate.

1. The method for preparing silane-modified alkali-free glass fiber cloth is as follows: immersing alkali-free glass fiber cloth into silane coupling agent-ethanol solution with the mass concentration of 3%, holding for 20 seconds at 20'C, and then taking out the alkali-free glass fiber cloth, baking for 12 hours under nitrogen atmosphere at 90° C. The silane coupling agent may be γ-methacryloyloxypropyltrimethoxysilane 2. The method for preparing modified carbon nanotubes is as follows:
(1) Firstly, pressing the carbon nanotubes into a cake shape with a thickness of 0.5 mm and a diameter of 0.5 cm, and immersing the cake into plasma for reacting 1200 seconds to obtain oxidized carbon nanotubes.

The carbon nanotubes may be single-walled carbon nanotubes, with a diameter of 10 nm and a length of 5 microns, The raw material of plasma is the mixture of argon with a purity of 99.995%, and water vapor, the water vapor accounts for 0.5%. The frequency for producing the plasma is 13.56 MHz, and the power is 100 W.

(2) Carbon nanotubes are added to the mixed liquor consisting of 95 wt % of ethanol and silane coupling agent such as γ-methacryloyloxypropyltrimethoxysilane according to the weight ratio of 10:1. Hydrochloric acid with a concentration of 1M is added to adjust pH to be 2.5, and the carbon nanotubes are heated for 6 hours at 50° C. under the condition of nitrogen. After this, the carbon nanotubes are washed twice with anhydrous ethanol, and then added to an oven for baking for 8 hours at 60° C. in the presence of nitrogen atmosphere.

3. The method for preparing modified nitrile rubber is as follows:

(1) In parts by weight, mixing 5 parts of methacrylic acid monomer, 50 parts of butadiene and 10 parts of acrylonitrile into a mixed solution, adding 0.5 wt % of azodiisobutyronitrile and 0.1 wt % of tert-dodecylthiol in the mixed solution, after introducing nitrogen, continuously stirring, and heating up to 50° C. for thermostatic reaction for 5 hours to obtain CTBN;

(2) In parts by weight, mixing 10 parts of CTBN, 100 parts of bisphenol-A epoxy resin, 15 parts of methacrylic acid and 1 part of Triphenylphosphine as catalyst, continuously stirring under the condition of loading nitrogen, heating up to 100° C., and then reacting for 4 h, at the end of the reaction, naturally cooling to the room temperature.

4. The method for preparing prepolymerized silane oligomers is as follows: in parts by weight, adding 1 part of 95 wt % ethanol to 2 parts of silane coupling agent γ-methacryloyloxypropyltrimethoxysilane (KH-570, CAS No.:2530-85-0), continuously stirring under the condition of loading nitrogen, heating up to 60° C., and then performing thermal reaction for 5 hours, finally, removing the ethanol through reduced pressure distillation.

2. The preparation method of the safety toe caps made from the nano composite material, may comprise the following steps: uniformly mixing up all components of the resin paste according to a ratio, subsequently uniformly coating the mixture on a single layer of glass fiber cloth, subsequently respectively covering a layer of PE film on the upper and lower surfaces of the glass fiber cloth coated with the resin paste, then rolling through a roller to obtain a sheet material, aging the sheet material for 28 hours at 35° C., cutting the aged sheet material, tearing off the PE films, stacking the cut aged sheet material into the pre-formed toe caps by using the hand lay-up method (the present routine method), placing into the fixed mold on the thermal compressor, thermally pressing for 200 seconds under the pressure of 30 MPa and the temperature of 35° C. and molding, demolding, and subsequently grinding and trimming to obtain a toe cap product.

Embodiment 2

1. Raw material formula:

The safety toe caps made from the nano composite material are made by press-fitting a plurality layers of laminated glass fiber cloth coated with resin paste, the percentage ratio of the resin paste to the glass fiber cloth is as follows: the resin paste accounts for 45%, and the silane-modified alkali-free glass fiber cloth accounts for 55%.

The resin paste comprises the following formula components in percentage by mass: 30% of bisphenol-A vinyl ester resin (commercially available), 5% of modified nanotube, 30% of modified nitrile rubber, 5% of polyurethaneacrylate (commercially available), 2% of prepolymerized silane oligomer, 0.5% of high temperature initiator A (tert-Butyl peroxybenzoate, commercially available), 1.5% of medium temperature initiator B (tert-Butyl peroxy-2-ethylhexanoate, commercially available), 10% of low-profile additive (polycaprolactone, commercially available), 10% of magnesium oxide, 1% of Magnesium hydroxide and 5% of zinc stearate.

1. The preparation method of the silane-modified alkali-free glass fiber cloth is made by immersing a piece of alkali-free glass fiber cloth into ethanol solution of silane coupling agent γ-methacryloyloxypropyltrimethoxysilane with the mass concentration of 8%, keeping for in the solution for 10 seconds at 25° C., subsequently taking out the alkali-free glass fiber cloth, and drying for 10 hours in nitrogen at 110° C.

2. The preparation method of the modified carbon nanotube comprises the following steps:

(1) Firstly, making the carbon nanotubes into a cake shape with the thickness of 1 mm and the diameter of 5 cm, and soaking the cake in plasma to react for 550 seconds to obtain the oxidized carbon nanotubes. [0061] The carbon nanotubes are multi-walled carbon nanotubes, wherein the diameter of the carbon nanotubes is 90 nanometers and the length thereof is 50 micrometers.

The raw material of plasma is a mixture of argon with a purity of 99.995% and steam, wherein the steam accounts for 2% of the volume percent of the raw material; the frequency of the radio-frequency for generating the plasma is 13.56 MHz and the power is 200 W.

(2) Adding the oxidized carbon nanotubes into 95 wt % of a mixture solution with ethanol and a silane coupling agent γ-methacryloyloxypropyltrimethoxysilane, which are mixed according to a weight ratio of 50:1, adding hydrochloric acid with concentration value of 1% to regulate the pH value to be 5.5, heating for 5 hours at 60° C., washing the nanoutubes 3 times with ethanolanhydrous ethanol, and subsequently drying the nanotubes in an oven for 6 hours at 80° C. in nitrogen.

3. The preparation method of the modified nitrile rubber comprises the following steps:

(1) In parts by weight, uniformly mixing 10 parts of methyl acrylic monomer, 60 parts of butadiene and 30 parts of acrylonitrile into a mixture liquid, further adding azodiisobutyronitrile which accounts for 2% of the weight of the mixture liquid and tert-dodecylthiol which accounts for 1% of the weight of the mixture liquid, introducing nitrogen, subsequently continuously stirring, heating to be 70° C., and reacting for 2 hours at constant temperature so as to obtain carboxy-terminated butadiene-acrylonitrile; (2) In parts by weight, mixing 25 parts of carboxy-terminated butadiene-acrylonitrile, 100 parts of bisphenol-A epoxy based vinyl ester resin, 20 parts of methacrylic acid and 2 parts of triphenyiphosphine, continuously stirring under the condition that nitrogen is supplied, raising the temperature to be 150° C., keeping the temperature and reacting for 2 to 4 hours, and after the reaction, naturally cooling down to be the room temperature.

4. The preparation method of the prepolymerized silane oligomer comprises the following steps: in parts by weight, adding 3 parts of 95 wt % ethanol into 5 parts of silane coupling agent γ-methacryloyloxypropyltrimethoxysilane (KH-570, CAS No.:2530-85-0), continuously stirring under the condition that nitrogen is supplied, raising the temperature to be 80° C., keeping the temperature and reacting for 2 hours, and finally depressurizing and distilling to remove ethanol.

2. The preparation method of the safety toe caps made from the nano composite material, comprising the following steps: uniformly mixing up all components of the resin paste according to a ratio, subsequently uniformly coating the mixture on a single layer of glass fiber cloth, subsequently respectively covering a layer of PE film on the upper and lower surfaces of the glass fiber cloth coated with the resin paste, then rolling through a roller to obtain a sheet material, aging for 20 hours at 45° C., cutting the sheet material, tearing off the PE films, stacking the cut sheet material into the pre-formed toe caps by using the hand lay-up method, placing into the fixed mold on the thermal compressor, thermally pressing for 150 seconds under the pressure of 45

MPa and the temperature of 155° C. and molding, demolding, and subsequently grinding and trimming to obtain the toe cap product.

Embodiment 3

1. Raw Material Formula:

The safety toe caps made from the nano composite material are made by press-fitting a plurality layers of laminated glass fiber cloth coated with resin paste, the percentage ratio of the resin paste to the glass fiber cloth is as follows: the resin paste accounts for 40%, and the silane-modified alkali-free glass fiber cloth accounts for 60%.

The resin paste comprises the following formula components in percentage by mass: 30% of bisphenol-A vinyl ester resin (commercially available), 3% of modified nanotubes, 25% of modified nitrile rubber, 25% of polyurethaneacrylate (commercially available), 1°/0 of prepolymerized silane oligomer, 2% of high temperature initiator A tert-Butyl peroxybenzoate (commercially available), 1% of medium temperature initiator B tert-Butyl peroxy-2-ethylhexanoate (commercially available), 5% of polycaprolactone (commercially available), 5% of magnesium oxide, 1% of magnesium hydroxide and 2% of zinc stearate.

1. The preparation method of the silane-modified alkali-free glass fiber cloth is made by immersing a piece of alkali-free glass fiber cloth into an ethanol solution of a silane coupling agent γ-methacryloyloxypropyltrimethoxysilane with the mass concentration of 8%, keeping for 10 seconds at 25° C., subsequently taking out the alkali-free glass fiber cloth, and drying for 10 hours in nitrogen at 110° C.

2. The Preparation Method of the Modified Carbon Nanotube Comprises the Following Steps:

(1) Firstly, making the carbon nanotubes into a cake shape with the thickness of 1 mm and the diameter of 2 cm, and soaking the cake in plasma to react for 300 seconds to obtain the oxidized carbon nanotubes.

The carbon nanotubes are multi-walled carbon nanotubes, wherein the diameter of the carbon nanotubes is 90 nanometers and the length thereof is 50 micrometers.

The raw material of plasma is a mixture of argon with a purity of 99.995% and steam, wherein the steam accounts for 2% of the volume percent of the raw material; the frequency of the radio-frequency for generating the plasma is 13.56 MHz and the power is 250 W.

(2) Adding the oxidized carbon nanotubes into 95 wt % of a mixture solution with ethanol and a silane coupling agent γ-methacryloyloxypropyltrimethoxysilane which are mixed according to a weight ratio of 5:1, adding hydrochloric acid with concentration value of 1M to regulate the pH value to be 3, heating for 3 hours at 75° C., washing the carbon nanotubes 4 times using anhydrous ethanol, and subsequently drying the carbon nanotubes in an oven for 6 hours at 80° C. in nitrogen.

3. The Preparation Method of the Modified Nitrile Rubber Comprises the Following Steps:

(1) In parts by weight, uniformly mixing 10 parts of methyl acrylic monomer, 55 parts of butadiene and 20 parts of acrylonitrile into a mixture liquid, further adding azodiisobutyronitrile which accounts for 1% of the weight of the mixture liquid and tert-dodecylthiol which accounts for 0.5% of the weight of the mixture liquid, introducing nitrogen, subsequently continuously stirring, heating to be 65° C., and reacting for 2 hours at constant temperature so as to obtain carboxy-terminated butadiene-acrylonitrile;

(2) In parts by weight, mixing 15 parts of carboxy-terminated butadiene-acrylonitrile, 100 parts of bisphenol-A epoxy based vinyl ester resin, 25 parts of methacrylic acid and 1.5 parts of triphenylphosphine, continuously stirring under the condition that nitrogen is supplied, raising the temperature to be 120° C., keeping the temperature and reacting for 3 hours, and after the reaction, naturally cooling down to room temperature.

4. The preparation method of the prepolymerized silane oligomer comprises the following steps: in parts by weight, adding 1 part of 95 wt % ethanol into 3 parts of silane coupling agent γ-methacryloyloxypropyltrimethoxysilane (KH-570, CAS No.:2530-85-0), continuously stirring under the condition that nitrogen is supplied, raising the temperature to be 70° C., keeping the temperature and reacting for 3 hours, and finally depressurizing and distilling to remove ethanol.

2. The preparation method of the safety toe caps made from the nano composite material, characterized by comprising the following steps: uniformly mixing up all components of the resin paste according to a ratio, subsequently uniformly coating the mixture on a single layer of glass fiber cloth, subsequently respectively covering a layer of PE film on the upper and lower surfaces of the glass fiber cloth coated with the resin paste, then rolling through a roller to obtain a sheet material, aging for 20 hours at 35° C., cutting the sheet material, tearing off the PE films, stacking the cut sheet material into the pre-formed toe caps by using the hand lay-up method (the present routine method), placing into the fixed mold on the thermal compressor, thermally pressing for 150 seconds under the pressure of 45 MPa and the temperature of 155° C. and molding, demolding, and subsequently grinding and trimming to obtain the toe cap product.

Embodiment 4

1. Raw material formula: the safety toe caps made from the nano composite material are made by press-fitting a plurality layers of laminated glass fiber cloth coated with resin paste, the percentage ratio of the resin paste to the glass fiber cloth is as follows: the resin paste accounts for 40%, and the silane-modified alkali-free glass fiber cloth accounts for 60%.

The resin paste comprises the following formula components in percentage by mass:
30% of bisphenol-A vinyl ester resin (commercially available), 2% of modified nanotubes, 30% of modified nitrile rubber, 10% of polyurethaneacrylate (commercially available), 2% of prepolymerized silane oligomer, 2% of high temperature initiator A tert-butylperoxybenzoate (commercially available), 1% of medium temperature initiator B tert-butyl peroxy-2-ethylhexanoate (commercially available), 10% of polycaprolactone (commercially available), 5% of magnesium oxide, 3% of Magnesium hydroxide and 5% of zinc stearate.

1. The preparation method of the silane-modified alkali-free glass fiber cloth is made by immersing a piece of alkali-free glass fiber cloth into an ethanol solution of silane coupling agent γ-methacryloyloxypropyltrimethoxysilane with the mass concentration of 5%, keeping for 15 seconds at 20° C., subsequently taking out the alkali-free glass fiber cloth, and drying the alkali-free glass fiber cloth for 11 hours in nitrogen at 100° C.

2. The preparation method of the modified carbon nanotube comprises the following steps:
(1) Firstly, making the carbon nanotubes into a cake shape with the thickness of 0.5 mm and the diameter of 2 cm, and soaking into plasma to react for 720 seconds to obtain the oxidized carbon nanotubes.

The carbon nanotubes are multi-walled carbon nanotubes, wherein the diameter of the carbon nanotubes is 60 nanometers and the length thereof is 30 micrometers.

The raw material of plasma is a mixture of argon with a purity of 99.995% and steam, wherein the steam accounts for 1% of the volume percent of the raw material; the frequency of the radio-frequency for generating the plasma is 13.56 MHz and the power is 180 W.
(2) Adding the oxidized carbon nanotubes into 95 wt % of a mixture solution with ethanol and a silane coupling agent which are mixed according to a weight ratio of 50:3, adding hydrochloric acid with a concentration of 1M to regulate the pH value to be 3, heating for 4 hours at 60° C., washing the carbon nanotubes 3 times by using anhydrous ethanol, and subsequently drying the carbon nanotubes in an oven for 7 hours at 70° C. in nitrogen.
3. The preparation method of the modified nitrile rubber comprises the following steps:
(1) In parts by weight, uniformly mixing 10 parts of methyl acrylic monomer, 50 parts of butadiene and 40 parts of acrylonitrile into a mixture liquid, further adding azodiisobutyronitrile which accounts for 1% of the weight of the mixture liquid and tert-dodecylthiol which accounts for 0.5% of the weight of the mixture liquid, introducing nitrogen, subsequently continuously stirring, heating to be 60° C., and reacting for 3 hours at constant temperature so as to obtain carboxy-terminated butadiene-acrylonitrile;
(2) In parts by weight, mixing 25 parts of carboxy-terminated butadiene-acrylonitrile, 100 parts of bisphenol-A epoxy based vinyl ester resin, 20 parts of methacrylic acid and 1 part of triphenylphosphine, continuously stirring under the condition that nitrogen is supplied, raising the temperature to be 120° C., keeping the temperature and reacting for 3 hours, and after the reaction, naturally cooling down to be the room temperature, and having an acid value less than 30 mg KOH/g after reaction.
4. The preparation method of the prepolymerized silane oligomer comprises the following steps: in parts by weight, adding 3 parts of 95 wt % ethanol into 2 parts of silane coupling agent γ-methacryloyloxypropyltrimethoxysilane (KH-570, CAS No.:2530-85-0), continuously stirring under the condition that nitrogen is supplied, raising the temperature to be 70° C., keeping the temperature and reacting for 3 hours, and finally depressurizing and distilling to remove ethanol.
2. The preparation method comprises the steps of uniformly mixing all components of the resin paste, and then uniformly coating the resin paste on a single glass fiber cloth, respectively covering a layer of PE film on the upper and lower surface of the glass fiber cloth coated with the resin paste, rolling to obtain a sheet material through a roller, curing the sheet material for 24 h at 40° C., cutting and shaping the sheet material, peeling off the PE film, folding the cut and shaped sheet material into preformed toe caps through a hand lay-up method (an existing conventional method), and then placing the toe caps into a fixed mold on a hot press so as to form the toe caps after thermally pressing for 180 seconds in the pressure of 40 MPa at 150° C., and demolding to obtain the toe cap product after grinding and trimming procedures.

Contrast Example 1

The difference of the contrast example 1 and the embodiment example 4 is the formula of the resin paste. The other contrast examples are consistent with embodiment example 4.

According to the mass percentage, the formula of the resin paste is as follows:
74% of bisphenol-A epoxy based vinyl ester resin (commercially available), 2% of high temperature initiator A tert-butyl peroxybenzoate (commercially available), 1% of medium temperature initiator B tert-Butyl peroxy-2-ethylhexanoate (commercially available), 10% of polycaprolactone (commercially available), 5% of magnesium oxide, 3% of magnesium hydroxide, and 5% of zinc stearate.

Contrast Example 2

The difference of the contrast example 1 and the embodiment example 4 is the formula of the resin paste, and contrast example 2 is consistent with the same embodiment example 4.

According to the mass percentage, the formula of the resin paste is as follows:
32% of bisphenol-A epoxy based vinyl ester resin (commercially available), 30% of modified nitrile rubber, 10% of polyurethaneacrylate (commercially available), 2% of prepolymerized silane oligomer, 2% of high temperature initiator A tert-Butyl peroxybenzoate (commercially available), 1% of medium temperature initiator B tert-Butyl peroxy-2-ethylhexanoate (commercially available), 10% of shrinkage reduction agent polycaprolactone (commercially available), 5% of magnesium oxide, 3% of magnesium hydroxide, and 5% of zinc stearate.

Contrast Example 3

The difference of the contrast example 1 and the contrast 4 is the formula of the resin paste, and contrast example 3 is consistent with embodiment example 4.

According to the mass percentage, the formula of the resin paste is as follows: 30% of bisphenol-A epoxy based vinyl ester resin (commercially available), 2% unmodified carbon nanotubes, 30% of unmodified nitrile rubber, 10% of polyurethaneacrylate (commercially available), 2% of prepolymerized silane oligomer, 2% of high temperature initiator A tert-butyl peroxybenzoate (commercially available), 1% of medium temperature initiator B tert-butyl peroxy-2-ethylhexanoate (commercially available), 10% of polycaprolactone (commercially available), 5% of magnesium oxide, 3% of magnesium hydroxide, and 5% of zinc stearate.

Performance Test
1. A high resolution scanning electron microscope (SEM) is utilized to characterise the cross-section of the cured resin samples which were added raw carbon nanotube (CNT), modified CNT and without any types of CNT, the FIG. 1(a) shows the cross-section of the cured resin samples which without CNT); observation shows that the broken resin generates homodromous broken lines. The broken surface is smooth and is provided with some stripes which been pulled out are about 1 micron in scale. FIG. 1(b) is the cross-section of the cured resin samples which include the unmodified CNT. In FIG. 1(b), the aggregation of the unmodified CNT can be obviously seen, so as to form an aggregation which is 5-10 μm in scale; and in the resin around the aggregation, no carbon nanotubes exist, so that the dispersion of the unmodified CNT in a resin substrate is very poor, and the excellent property of the CNT cannot be performed in the composite. FIG. 1 (c) is the cross-section of the resin which added with the modified CNT, the CNTs are uniformly dispersed in the resin substrate in nanoscale. The added modified CNT in FIG. 1(c) includes grafted functional groups on the surfaces of the carbon nanotubes during the modification process. As a result, the aggregation effect of the carbon nanotubes can be effectively solved, and the carbon nanotubes are uniformly distributed in the resin substrate to form fracture surfaces which are fine and coarse (generating crazings to absorb more energy), so that the better reinforcing effect can be achieved, and the stability and reliability of improving the strength of composite material can be improved simultaneously.

Figure 2:
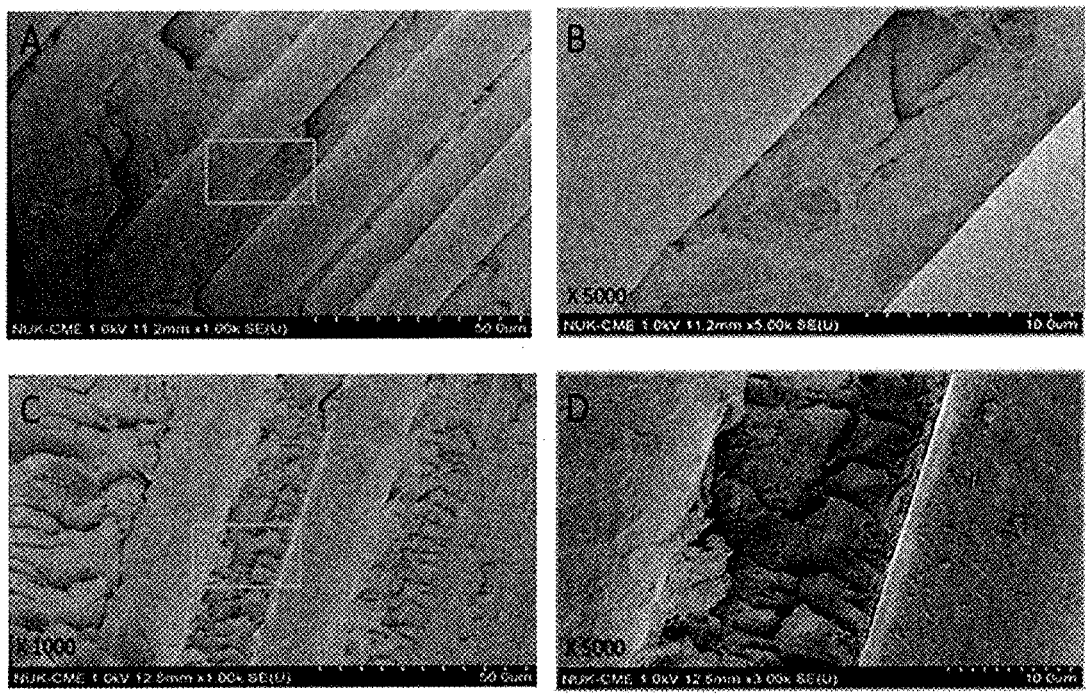
FIG. 2 is the SEM figure for resin paste and glass fiber cloth composite samples.

2. FIG. 2A shows the morphology of a cross-section sample of the resin and the glass fiber cloth composite material prepared according to the match ratio of the contrast sample 2, the FIG. 2B is the enlarged drawing of the FIG. 2A; and the FIG. 2C is the morphology of a cross-section sample of the resin paste and the glass fiber cloth composite material prepared according to the match ratio of the embodiment 4, the FIG. 2D is the enlarged drawing of the FIG. 2C. With view of the microstructures of the broken surfaces of samples which is not added with the CNT, the broken surface of the sample is smooth, not coarse (compare FIG. 2A and FIG. 2B). In the sample which is added with the modified CNT, the broken surface is filled with thin veins, and the fractured surfaces are fine and uniformly distributed, so that the fine fractured surface proves that the extension of the fractured surface of the sample is blocked by the uniformly distributed carbon nanotubes in the sample containing the carbon nanotubes due to the addition of the modified CNT when the material is broken, the fracture extension shall bypass the CNTs, and the carbon nanotubes are uniformly distributed; strong interface strength can be generated by a covalent bond bonding between the carbon nanotubes and the resin, so that more fractured veins show that the materials can absorb more impact energy and have stronger fracture resistance.

3. The CHARPY impact strength test results of the nanocomposite samples.

The penetrating impact of the national standard CHARPY impact experiment GB/T 1043.1-200 is adopted to test the toe cap examples. Ten to 15 samples are prepared for testing every time. The obtained data is the average value In Table 1, the ascent rate corresponds to the contrast example 1.

TABLE 1

|  | Appearance | Impact strength (kJ/m2) | Rate of ascent (%) |
|---|---|---|---|
| Contrast example 1 | Orange and transparent | 20.1 | 0.00 (Contrast value) |
| Contrast example 2 | Milky white and opaque | 26.2 | 30.35 |
| Contrast example 3 | Black grey and opaque, with fine sand black points | 22 | 9.45 |
| embodiment example 1 | Regular black without black points | 33.7 | 67.66 |
| embodiment example 2 | Regular black without black points | 34 | 69.15 |
| embodiment example 3 | Regular black without black points | 34.6 | 72.14 |
| embodiment example 4 | Regular black without black points | 35.1 | 74.63 |

According to the result of the table 1, the impact strength of the pure resin paste is worst in the seven samples which is not added any toughening agent in the resin paste (contrast 1); the strength is improved by 30.35% after three types of toughening agents are added (contrast 2), the effect of the toughening agents enhances the impact strength. According to the series of experimental results of adding each type of carbon nanotubes to the resin as reinforcement, the impact strength of the formula with unmodified CNT (contrast 3) is worse than contrast 2 which did not add CNT, since the unmodified CNT has ultra-high surface area (>200 m^2/g), resulting in high surface energy, and easily forming aggregations in the resin. These aggregations are filled with the carbon tunes but lack the resin; after the resin is cured, the defects of the CNT aggregations are distributed everywhere in the resin, forming cracks in the resin as many defects when the materials have been impacted by external stress. Fractures generate more easily when the materials are impacted by external stress due to there being more defects in the materials. In the experimental result (embodiments 1, 2, 3 and 4) with the modified CNT added, the impact strength of resin is enhanced, and is greater than the pure resin by about 60%, and greater than the resin added with the 3 toughening agents by about 30%. The modified CNT not only overcome the problem of the aggregation of the carbon nanotubes, but also form strong covalent bonds between the carbon nanotubes and the resin, and are bonded with the resin on the ultra-high surface area of the carbon nanotubes, strongly reinforcing the impact strength of the resin.

4. The impact test result (the naked test of the toe caps) of the nanocomposite safety toe caps.

The toe caps prepared by the nanocomposite are subjected to material test according to a United States Standard (ASTM F2413-05 MI/75 C/75).

According to the United States Standard, the toe caps are directly placed on a test platform of a steel base (naked test), a hard clay with the diameter of phi 25+/−0.5 mm is placed inside the toe caps, and is centered to be tangent to an opening end, and then the toe caps are subjected to impact test. The impact head is a cylindrical point impact, and the impact head is 25+/−0.5 mm in diameter, 25 mm in cambered surface, and 60 mm in length. The impact energy is 102 J, and the inner safe height of the 8 yard toe cap is 15 mm according to the requirements of the inner height of the impacted toe caps (the height of the deepest sunken part of the impacted clay).

According to the standard of safety toe cap, the higher of the inner safe height of the impacted toe caps means the shock proof performance of the toe caps is better (under the condition that the top part of the toe caps is not fractured after the impact). The testing shows the materials of this invention can absorb more impact energy, and the test results are seen in the table 2.

TABLE 2

Experimental results of the naked test of the toe caps

| Sample No. | Contrast 2 | Contrast 3 | Embodiment | Embodiment | Embodiment | Embodiment |
|---|---|---|---|---|---|---|
| 1. | 16.68 | 15.84 | 19.84 | 20.23 | 20.11 | 20.68 |
| 2. | 16.44 | 15.63 | 19.69 | 15.87 | 20.03 | 20.34 |
| 3. | 16.32 | 15.25 | 18.73 | 15.54 | 19.72 | 19.94 |
| 4. | 16.38 | 15.1 | 18.68 | 19.27 | 19.52 | 19.52 |
|  | 15.88 | 14.66 | 18.56 | 18.56 | 19.25 | 19.63 |
| 6. | 15.67 | 14.43 | 18.33 | 1S.53 | 18.78 | 18.95 |
| 7. | 15.59 | 14.26 | 17.76 | 17.89 | 18.52 | 18.88 |
| 8. | 15.53 | 14.22 | 17.54 | 17.71 | 18.28 | 18.68 |
| Average value (mm) | 16.06 | 14.92 | 18.64 | 18.3 | 20.02 | 19.58 |
| Average rate of ascent (%) | 0.00 | −7.08 | 16.06 | 18.30 | 20.02 | 21.83 |
| Minimum value (mm) | 15.53 | 14.22 | 17.54 | 17.71 | 18.28 | 18.68 |
| Standard (naked test) | | | 15 mm | | | |
| Whether the light can pass the fracture | Nothing | The light can pass the fracture of the sample 5 and the sample 7 | Nothing | Nothing | Nothing | Nothing |
| Whether results qualified | Conformity | Non-conformity | Conformity | Conformity | Conformity | Conformity |

The calculation formula of the average rate of ascent is equal to [(the average values of all samples-the average value of the contrast 2)/the average value of the contrast 2]*100%.

According to the test result of the impacted toe caps in the table 2, after the toe caps are prepared by the formula (contrast 2) of adding three types of toughening agents in the resin, the testing value can pass the standard of United State, but it's closer to the standard value; in the formula (contrast 3) of adding the unmodified CNT in the resin, some of the toe caps cannot pass the safety standard and light can pass through the fracture crack of impacted toe caps. This shows that the unmodified carbon nanotubes have a negative influence after being added into the resin. CNT aggregation forms defect points in the resin due to the addition of the unmodified carbon nanotubes, so that the material cannot effectively absorb the impact energy to easily result in fraction. The toe caps prepared by the formulas (embodiments 1-4) of adding the three types of toughening agents and the modified carbon nanotubes into the resin can pass the standard of United States, exceeding the standard values, and is higher than the contrast 2 by about 20%, so that the strength of the toe caps can be obviously enhanced due to the addition of the modified carbon nanotubes. Because the strength of composite is enhanced, we can reduce the thickness of the toe caps, and the weight of the toe caps can be reduced when the thickness of the toe caps is reduced. Therefore, we can prepare thinner and lighter nanocomposite safety toe caps which can pass the safe standard specifications of all countries.

Figure 3:
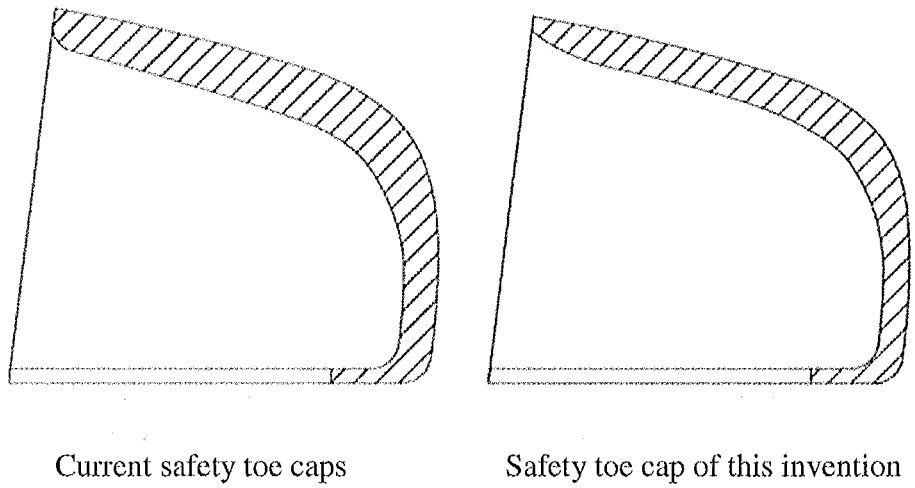
FIG. 3 is the thickness comparison figure for existing safety toe caps and the one in this present invention.

5. Comparison for the thicknesses of the safety nanocomposite top caps:

FIG. 3 is a comparison figure of the thickness of existing safety toe caps and the safety toe caps provided by the invention, wherein the left figure is the wall thickness of the existing safety toe caps, and the right figure is the wall thickness (light and thiner design) of the safety toe caps provided by the invention. According to the invention, the walls of the safety toe caps provided by the invention are thinner, data shows that the wall thickness of the safety toe caps provided by the invention is averagely reduced by about 1.5 mm (the thickest place of the wall thickness of the existing safety toe caps is about 6 mm), the weight is 78.9% of the existing safety toe cap, and the wall thickness of the safety toe caps provided by the invention is thinner, but the performance can still pass the test (see the table 3) of the United States standard (ASTM F2413-05 MI/75 C/75). The data in the table 3 proves that the safety toe caps provided by the invention can pass the standard and realize triple targets of the safety toe caps of being stronger, thinner and lighter.

TABLE 3 compares the naked measurement value of the safety toe caps (the same model and size) prepared by the formula of the embodiment 4 provided by the invention and the existing safety toe caps.

| Sample | Safety toe caps provided by the invention | Existing safety toe caps |
|---|---|---|
| Average weight (S) | 49.2 | 62.3 |
| Thickest wall thickness (mm) | 4.5 | 6.0 |
| Result of impact test | | |
| Sample 1. | 20.68 | 16.85 |
| Sample 2. | 20.34 | 16.47 |
| Sample 3. | 19.94 | 16.42 |
| Sample 4. | 19.52 | 16.30 |
| Sample 5. | 19.63 | 16.27 |
| Sample 6. | 18.95 | 16.19 |
| Sample 7. | 18.88 | 16.15 |
| Sample 8. | 18.68 | 16.01 |
| Average value (mm) | 19.58 | 16.33 |
| Minimal value (mm) | 18.68 | 16.01 |
| Standard (naked measurement) (mm) | 15.00 | 15.00 |
| Whether the light can pass the fracture | Nothing | Nothing |
| Whether results qualified | Conformity | Conformity |

6. Test result of a dynamic mechanical analysis meter (DMA):

TABLE 4

| Sample No. | Storage modulus (MPa)(27° C.) | Rate of ascent (%) |
|---|---|---|
| Contrast sample 2 | 3545.4 | 0.00 |
| Contrast sample 3 | 4103.6 | 15.74 |
| Embodiment sample 1 | 4598.86 | 29.71 |
| Embodiment sample 2 | 4782.49 | 34.89 |
| Embodiment sample 3 | 5040.8 | 42.18 |
| Embodiment sample 4 | 5164.5 | 45.67 |

TABLE 5

| Sample No. | Loss modulus (MPa)(27° C.) | Rate of ascent (%) |
|---|---|---|
| Contrast sample 2 | 128.97 | 0.00 |
| Contrast sample 3 | 109.88 | −14.80 |
| Embodiment sample 1 | 158 | 22.51 |
| Embodiment sample 2 | 165 | 27.94 |
| Embodiment sample 3 | 172.36 | 33.64 |
| Embodiment sample 4 | 176.99 | 37.23 |

The calculation formula of the rate of ascent is equal to [(the numerical values of all samples-the numerical value of the contrast 2)/the numerical value of the contrast 2]*100%.

Table 4 and table 5 show DMA test samples (size: 10 mm*5 mm*1 mm) prepared by pouring each formula resin into the molds and then cured in hot oven at 105° C. for 3 hr. After curing, the DMA samples are ground with fine sand paper. An observed storage modulus and loss modulus are obtained by heating up to 150° C. from 0° C. at the vibration frequency of 1 Hz and the heating speed of 2° C./min in an apparatus. The temperature of the toe cap product is room temperature, so that the value of 27° C. is used as a reference. In the table 4, the storage modulus shows the rigidity of the material, and the loss modules shows the damping capacity or toughness (the capacity of absorbing the energy) of the material. When the unmodified CNT (contrast 3) is present in the formula, the rigidity is improved, but the toughness is reduced; the material is easily fractured due to the defects generated due to the carbon nanotube aggregation in the resin, and the resin is hard and brittle due to the unmodified CNT according to the data. The rigidities and toughness of the formulas (embodiments 1-4) added with each types of the modified carbon nanotubes are enhanced. The covalent bond is formed between the modified carbon nanotubes and the resin, provides high toughness and allows the high rigidity of the carbon nanotubes to be expressed as a property of the composite. These results also show that the modified carbon nanotubes can be uniformly distributed in the resin after being modified as shown in FIGS. 1 (c) and (d), and no aggregation is formed, so the toughness of composite can be enhanced. According to the above experimental data, when adding 2% of modified CNT, the rigidity and toughness of the resin containing the toughening agents is improved by 45.67% by the formula (embodiment 4), and the toughness can be increased by 37.23%. The result proves that the excellent mechanical performance of the carbon nanotubes can be fully displayed on the impact resistance and the rigidity of the composite through the specific modification on the surface of carbon nanotubes, and concept of the nanocomposite with a nano reinforcement can be realized.

The above embodiment is only an example embodiment of the toe caps. This exemplary embodiment does not limit the toe caps in any way, and the invention includes other variants and versions as defined by the claims.

What is claimed is:

1. Safety toe caps made from nano composite material, characterized in that the safety toe caps are made by hand-lay up method providing and pressing a plurality of layers of glass fiber cloth coated with resin paste into a die to form the end product, with the following percentage of the resin paste and the glass fiber cloth by mass:
   30-45% of the resin paste and 55-70% of the glass fiber cloth, 100% in total;
   the resin paste contains the following components in percentage by mass: 30-50% of thermosetting resin, 0.1-5% of modified carbon nanotubes, 10-30% of modified nitrile rubber, 5-25% of polyurethaneacrylate, 1-5% of prepolymerized silane oligomer, 0.5-2% of initiator A (tert-Butyl peroxybenzoate), 1-2% of initiator B (tert-Butyl peroxy-2-ethylhexanoate), 5-20% of low-profile additive, 1-10% of thickener A, 1-3% of thickener B and 2-5% of inner demolding agent.

2. The safety toe caps made from the nano composite material according to claim 1, characterized in that the glass fiber cloth is a piece of silane-modified alkali-free glass fiber cloth.

3. The safety toe caps made from the nano composite material according to claim 1, characterized in that the silane-modified alkali-free glass fiber cloth is prepared by immersing a piece of alkali-free glass fiber cloth into 3-8 wt. % solution of silane coupling agent in ethanol, remaining for 10-20 s at 20-25° C., and then taking the alkali-free glass fiber cloth out and drying for 10-12 hrs in nitrogen atmosphere at 90-110° C.

4. The safety toe caps made from the nano composite material according to claim 1, characterized in that the thermosetting resin is bisphenol A epoxy based vinyl ester resin; the initiator A is tert-Butyl peroxybenzoate; the initiator B is tert-Butyl peroxy-2-ethylhexanoate; the low-profile additive is polycaprolactone; the thickener A is magnesium oxide; the thickener B is magnesium hydroxide; the inner demolding agent is stearic acid zinc.

5. The safety toe caps made from the nano composite material according to claim 1, characterized in that the preparation of the modified carbon nanotubes comprises the following steps:
   (1) first, making the carbon nanotubes into a cake shape with 0.5-1 mm in thickness and 0.5-5 cm in diameter, and then immersing the carbon nanotube cakes into the plasma to react for 300-1,200 s to obtain oxidized carbon nanotubes;
   (2) adding the oxidized carbon nanotubes into a mixture of 95 wt % ethanol and silane coupling agent which are mixed according to a proportion of 50:(1-10) by weight, adjusting pH to 2.5-5.5 with hydrochloric acid, heating for 3-6 hrs at 50-75° C. while passing in nitrogen, washing for 2-4 times with ethanolanhydrous ethanol, and then placing into an oven for drying for 6-8 hrs at 60-80° C. in nitrogen atmosphere.

6. The safety toe caps made from the nano composite material according to claim 5, characterized in that the carbon nanotubes are single-walled carbon nanotubes or multi-walled carbon nanotubes, and the carbon nanotubes are 10-90 nm in diameter and 5-50 μm in length.

7. The safety toe caps made from the nano composite material according to claim 5, characterized in that the source gases of plasma is a mixture of 99.995% argon and steam, the steam being 0.5-5% by volume (volume percent); and the frequency of the plasma generator is 13.56 MHz and the RF power is 100-250 W.

8. The safety toe caps made from the nano composite material according to claim 1, characterized in that the preparation of the modified nitrile rubber comprises the following steps:
  (1) in parts by weight, uniformly mixing 5-10 parts of methyl acrylic monomer, 50-60 parts of butadiene and 10-40 parts of acrylonitrile to form a mixture, then adding azodiisobutyronitrile (0.5-2% of the weight of the mixture) and tert-dodecylthiol (0.1-1% of the weight of the mixture), stirring constantly after passing in nitrogen, heating to 50-70° C., and reacting for 2-5 hrs at constant temperature to obtain carboxy-terminated butadiene-acrylonitrile; and
  (2) in parts by weight, mixing 10-25 parts of carboxy-terminated butadiene-acrylonitrile, 100 parts of bisphenol-A epoxy based vinyl ester resin, 15-25 parts of methacrylic acid and 1-2 parts of triphenylphosphine, stirring constantly while passing in nitrogen, raising the temperature to 100-150° C., remaining the temperature and reacting for 2-4 hrs, and naturally cooling to room temperature at the end of reaction.

9. The safety toe caps made from the nano composite material according to claim 1, characterized in that the preparation method of the prepolymerized silane oligomer comprises the following steps: in parts by weight, adding 1-3 parts of 95 wt % ethanol into 2-5 parts of silane coupling agent KH-570(CAS No.:2530-85-0), continuously stirring under the condition that nitrogen is supplied, raising the temperature to be 60-80° C., keeping the temperature and reacting for 2-5 hours, and finally ethanol was evaporated under reduced pressure.

10. A preparation method of the safety toe caps made from the nano composite material, characterized by comprising the following steps: uniformly mixing up components of the resin paste according to a ratio, subsequently uniformly coating the mixture on a single layer of glass fiber cloth, subsequently respectively covering a layer of PE film on the upper and lower surfaces of the glass fiber cloth coated with the resin paste, then rolling through a roller to obtain a sheet material, aging for 20-28 hours at 35-45° C., cutting the prepreg in designed shape, tearing off the PE films, stacking the cut prepreg into pre-formed toe caps by using a hand layer-up method, subsequently hot-pressing for 150-250 seconds in the fixed mold in a hot-pressing machine in the pressure of 30-45 MPa at 135-155° C. to form, demolding, and subsequently grinding and trimming to obtain a product.

* * * * *